(12) United States Patent
Araki et al.

(10) Patent No.: US 11,734,267 B2
(45) Date of Patent: Aug. 22, 2023

(54) SYSTEM AND METHOD FOR INFORMATION EXTRACTION AND RETRIEVAL FOR AUTOMOTIVE REPAIR ASSISTANCE

(71) Applicant: Robert Bosch GmbH, Stuttgart (DE)

(72) Inventors: Jun Araki, Mountain View, CA (US); Lin Zhao, Sunnyvale, CA (US); Zhe Feng, Mountain View, CA (US)

(73) Assignee: Robert Bosch GMBH, Stuttgart (DE)

( * ) Notice: Subject to any disclaimer, the term of this patent is extended or adjusted under 35 U.S.C. 154(b) by 169 days.

(21) Appl. No.: 16/234,989

(22) Filed: Dec. 28, 2018

(65) Prior Publication Data

US 2020/0210426 A1    Jul. 2, 2020

(51) Int. Cl.
*G06F 16/30*       (2019.01)
*G06F 16/2452*    (2019.01)
*G06F 16/248*     (2019.01)
*G06F 16/9538*    (2019.01)

(52) U.S. Cl.
CPC ...... *G06F 16/24522* (2019.01); *G06F 16/248* (2019.01); *G06F 16/9538* (2019.01)

(58) Field of Classification Search
CPC .......... G06F 16/24522; G06F 16/9538; G06F 16/248
See application file for complete search history.

(56) References Cited

U.S. PATENT DOCUMENTS

| | | | | |
|---|---|---|---|---|
| 8,489,601 | B2 * | 7/2013 | Rajpathak | G06Q 10/20 707/736 |
| 2007/0174260 | A1 * | 7/2007 | Bachman | G06F 16/951 |
| 2008/0195601 | A1 * | 8/2008 | Ntoulas | G06F 16/313 |
| 2011/0119231 | A1 * | 5/2011 | Namburu | G06Q 10/06 707/609 |
| 2012/0233127 | A1 * | 9/2012 | Solmer | G06F 16/3347 707/661 |
| 2019/0034802 | A1 * | 1/2019 | Harshangi | G06N 3/088 |
| 2020/0183668 | A1 * | 6/2020 | Krishnamoorthy | G06K 9/6215 |
| 2020/0192932 | A1 * | 6/2020 | Deiseroth | G06F 16/532 |

* cited by examiner

*Primary Examiner* — Khanh B Pham
(74) *Attorney, Agent, or Firm* — Dickinson Wright PLLC

(57) ABSTRACT

A server includes a controller in communication with the server and configured to receive a query related to an issue with a vehicle, retrieve information related to the query from a database that includes structured data including data related to vehicle issues and a solution to the vehicle issues, determine whether the database includes structured data including data related to the solution responsive to the query, and output information including the solution to the issue when the determination identifies that the structured data including the solution in the database or retrieve information from a website when the determination identifies that the structured data including the solution is not found in the database, wherein the controller is further configured to retrieve the information from the website by conducting a keyword search for a first set of results and filtering the information from the website utilizing an autoencoder.

20 Claims, 6 Drawing Sheets

FIG. 6

Results from External Sources by Information Extraction (IE):

Search result for "ABS is not working":

| Rank | Matched Problem | Original Answer in Post | Solution Extracted by Bosch IE Algorithm | Source | Correct? |
|------|-----------------|-------------------------|------------------------------------------|--------|----------|
| 1 | doesnt have abs | Need to have inspected. Sounds like the master cylinder is locking up or the brake booster has failed or lost its vacuum. Need to inspect to find cause. Check brake booster lines first. | Sounds like the master cylinder is locking up or the brake booster has failed or lost its vacuum. Need to inspect to find cause. Check brake booster lines first. | link | ☐ |
| 2 | ABS light is on. ABS does not engage during sudden stops | you need to have your abs codes scanned first to see what CIRCUIT is failing, see a qualified mech to address this issue | you need to have your abs codes scanned first to see what CIRCUIT is failing, see a qualified mech to address this issue | link | ☒ |
| 3 | Is there a difference between abs nd the (abs) in like a bubble because mind is just abs | You'll need to have the computer scanned to get the fault code. That will lead you to the problem are with the ABS. Kind of hard to tell you what it will cost to repair without know the cause of the problem. | You'll need to have the computer scanned to get the fault code. That will lead you to the problem are with the ABS. | link | ☐ |
| 4 | where do I locate the abs computer, or the abs relay | This site has instructions on how to replace many ABS Modules, hope it helps: http://bit.ly/8z7rcm | This site has instructions on how to replace many ABS Modules, hope it helps: http://bit.ly/8z7rcm | link | ☐ |

[Add to Knowledge Base]

< Return to Search

FIG. 7

SYSTEM AND METHOD FOR INFORMATION EXTRACTION AND RETRIEVAL FOR AUTOMOTIVE REPAIR ASSISTANCE

TECHNICAL FIELD

The present disclosure relates to natural language processing (NLP), knowledge base (KB), and human machine interaction (HMI).

BACKGROUND

Information Retrieval (IR) may be utilized to satisfy a users' information need by obtaining relevant information resources from a collection of information resources. A user's information need is expressed as a query. Web search engines like Google and Bing are an example of IR, as users describe their information need with keywords and a collection of information resources is on the World Wide Web. Search engines may cover information in the general domain, and thus may be inadequate for specific use cases such as automotive repair assistance. Traditional examples of IR may be library information retrieval systems which may provide access to books, papers, reports, and other documents in some disciplines (e.g., medicine). Such system may contain structured knowledge bases with a predefined scheme (e.g., author, title, published year, etc.) In general, text to be searched may be indexed beforehand and ranked with respect to relevancy to users' queries, computed by ranking algorithms (e.g., BM25 and TF-IDF).

On the other hand, Information Extraction (IE) is aimed to structure and organize information resources from unstructured source data, allowing for efficient search and effective utilization of information in downstream applications. Unlike IR, IE may not involve specific users' information need. Rather, IE may normally assume a predefined set of information types, such as entities and relations, and stores instances of those types in knowledge bases. One example of IE is Open IE, whose goal is to extract relation tuples, typically binary relations, from plain text, such as ("Albert Einsten", "born", "in Ulm"). Most IE efforts are aimed at extracting information of general types, such as entities and relations, and thus are not readily applicable to domain-specific use cases.

SUMMARY

According to one embodiment, a server includes a controller in communication with the server, the controller configured to receive and parse a query related to an issue with a vehicle, wherein the controller is configured to parse the query utilizing an autoencoder to encode, compress, and decode the query, in response to the query, retrieve information related to the query from a database that includes structured data in a data schema related to both vehicle issues and a solution to the vehicle issues, determine whether the database is responsive to the query, and in response to the determination, output information including the solution to the issue when the solution is found in the database, or retrieve solution information from a website when the solution is not found in the database, wherein the controller is further configured to retrieve the solution information from the website by conducting a keyword search for a first set of results.

According to a second embodiment, a server comprises a controller in communication with the server, the controller is configured to receive and parse a query related to an issue with a vehicle, in response to the query, retrieve information related to the query from a database that includes structured data including data related to vehicle issues and a solution to the vehicle issues, determine whether the database includes structured data including data related to the solution responsive to the query, and output information including the solution to the issue when the determination identifies that the structured data including the solution in the database or retrieve information from a website when the determination identifies that the structured data including the solution is not found in the database, wherein the controller is further configured to retrieve the information from the website by conducting a keyword search for a first set of results and filtering the information from the website utilizing an autoencoder.

According to a third embodiment, a querying system includes an input device configured to allow a user to enter a query related to automotive repairs, a display configured to output information related to the query, a database that includes structured data with a data related to vehicle issues and a solution to the automotive repairs, and a processor in communication with the input device, database, and display. The processor is programmed to receive and parse the query, in response to the query, retrieve information related to the query from the database that includes a solution to the automotive repairs, determine whether the database includes structured data including data related to the solution responsive to the query, and output information including the solution to the issue when the structured data including the solution is found in the database or retrieve information from a website when the solution is not found in the database, wherein the processor is further configured to retrieve the information from the website by conducting a keyword search for a first set of results and filtering the information form the website utilizing an autoencoder to define a second set of results.

BRIEF DESCRIPTION OF THE DRAWINGS

FIG. 6 is an example results screen from the IR module.

FIG. 7 is an example screen of a ranked list of knowledge candidates extracted from the IE module.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A system that is described below may include two modules, an Information Retrieval (IR) and Information Exchange (IE) module. In the IR module, a user can provide a natural language query in the form of a phrase or a sentence that describes a car problem. The system may then find the problem that is the most similar to the query and its associated solution from an internal knowledge base. The IE module may extract with natural language processing technologies car problems and solutions from external source data, such as web forums, in an offline manner. When the IR module cannot find any relevant problems, it may utilize the extracted domain knowledge to find relevant problems and solutions. The system may also support augmentation of the internal knowledge base with the extracted knowledge that is verified by domain experts.

Thus, it may be beneficial to combine IR and IE functionalities for automotive repair assistance. IR tends to be precise, but have lower coverage. IE may be less precise, but may have a broader coverage. A holistic system that combines both the IR and IE modules may be effective to complement each other and the maintenance of underlying car repair knowledge becomes more sustainable.

Figure 1:
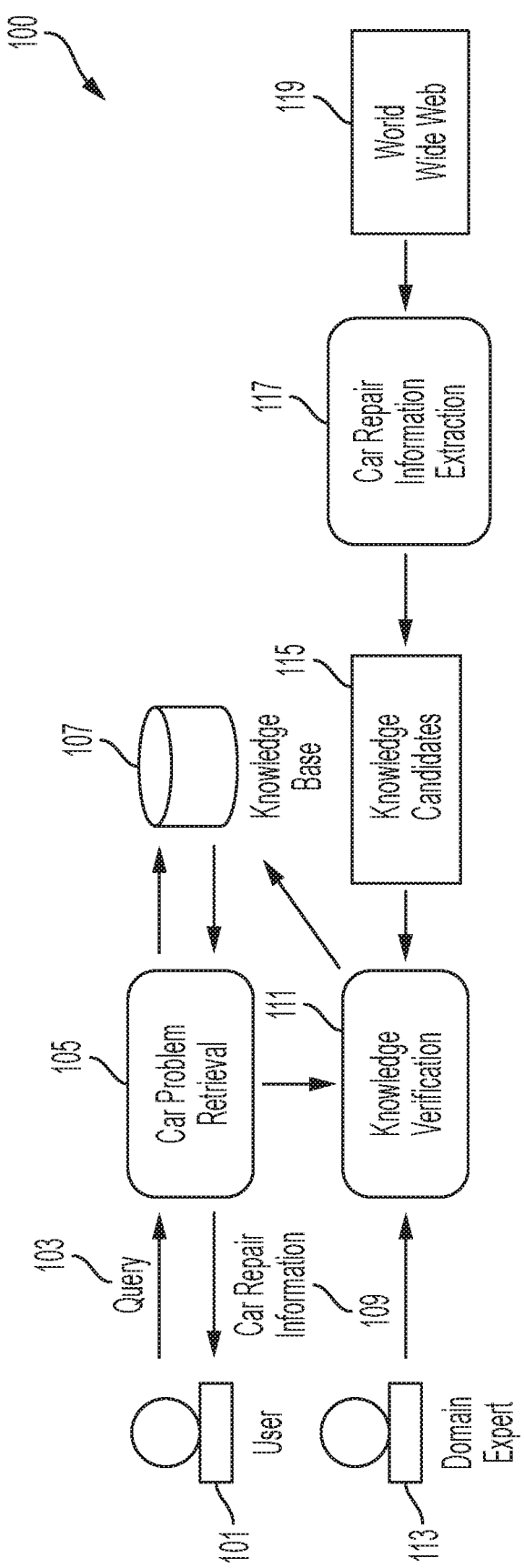
FIG. 1 is an overview diagram of the system with both an IR and IE module as related to the automotive repair domain.

FIG. 1 is an overview diagram of the system with both IR and IE module as related to the automotive repair domain. The system 100 may include two modules, an IR module and an IE module. The system may be an online web page that works in conjunction with servers, or in an alternative embodiment, a NLP voice recognition system (e.g. "Alexa," "SIRI," etc.) that is utilized to work on automotive repairs. In the IR module, users may describe any car problems for which they want to find solutions in an online manner. For example, a user may query a word ("noise), a phrase ("rough engine idling"), or a sentence ("ABS is not working."). The IR module may search the internal knowledge base and return the problem that is most similar to the query and its associated solution. The knowledge base may be constructed by knowledge engineers and domain experts on automotive repair.

In system 100, a user 101 may query 103 a word, phrase, or sentence that is utilized to describe a car problem. The system may utilize the query 103 to identify an associated issue at a car problem retrieval processing 105. The car problem retrieval processing 105 may be part of the IR module and work in conjunction with a knowledge base 107. The knowledge base 107 may be a specified database that stores information at either an online or offline server. The knowledge base 107 may have specified information and organized data schemas that are utilized for a specific application, such as automotive repairs. For example, the data schema of the knowledge base 107 in the present system 100 may include a schema that has specified data structure for issues in a vehicle and a specified data structure for solutions to the issue. The knowledge base 107 may be created by a domain expert (e.g. auto mechanic or car repairmen) with the help of engineers.

The car problem retrieval processing 105 in the IR module may employ a technology such as autoencoder (AE). The AE may be a neural network model to learn efficient representations in an unsupervised manner by reconstructing its input data. The AE may have various layers that include encoding layers, hidden layers, and decoding layers. By forcing the hidden layers to have lower dimensionality than input data, the AEs may attempt to induce useful features in the representations learned from the reconstruction task. The AE may be described in greater detail in FIG. 4, below.

When a query 103 has a solution found in the knowledge base 107, the system may output the car repair information 109 to a user 101. The car repair information 109 may be output on a web page or output of an NLP system via spoken audio/commands. The amount of human-crafted knowledge stored in the knowledge base 107 may be precise but small and cannot cover an entire area of car repair knowledge. Thus, the system 100 may need to rely on an IE module for solutions to problems with "white-space" issues.

The IE module of the system 100 may have knowledge verification 111 processing to assess information extracted from sources outside of the knowledge base 107. A domain expert 113 may be utilized to verify the information found in the knowledge verification 111. The domain expert 113 may also be utilized to choose and add certain items to the knowledge base 107 as deemed accurate. As discussed further below, information found to be accurate or relevant may be fed into the knowledge base 107 to expand the scope of the knowledge base 107. For example, an algorithm in the knowledge verification 111 processing may input information into the knowledge base 107.

While traditional IE algorithms may ignore a user's queries, the system embodiment disclose below can pinpoint when IE algorithms may be used to augment underlying knowledge once the IR module fails to find relevant knowledge against a query. The system may be able to eliminate such failure against semantically similar queries through the knowledge verification, as well as by additional support by domain experts. The system may bridge the gap between IR and IE by triggering knowledge verification at the time of car problem retrieval failure.

When the system cannot find any relevant car problems in the knowledge base against a user's query, it may additionally provide a link to trigger the knowledge verification process 111. When the knowledge verification process 111 is called, the system reuses the same query to output a ranked list of relevant knowledge candidates. To search relevant knowledge candidates efficiently from a large number of entire candidates, the system may perform a two-step retrieval. The system may have an empty results screen when querying a car problem in the knowledge database. In such an example, the similarity between the query and any problem in the knowledge base is lower than the threshold. Unlike the case where the system finds a problem (see e.g. FIG. 6), the system may display an additional link requesting to "Find Solutions from External Sources", which may take you to the knowledge verification page.

In the first step of the knowledge verification process 111, the system may employ a keyword-based retrieval algorithm such as BM25 or TF-IDF to obtain a moderate number of relevant candidates as an intermediate result from the entire knowledge candidates 115. In the second step of the knowledge verification process 111, the system may run the AE retrieval algorithm on the intermediate candidate set and form the final ranked list of knowledge candidates. The two-step retrieval enables efficient search by filtering out irrelevant candidates in the first step and using the AE-based retrieval algorithm only against a relatively small number of relevant candidates. Finally, the system displays the ranked list of knowledge candidates in a tabulated format, as shown, for example, in the screen of FIG. 7, which is described in more detail below. A domain expert 113 may review the final list of knowledge candidates to identify.

The IE module may run in an offline process and extract car repair information, such as car problems and solutions from the World Wide Web 119. For example, the system may search and query car repair websites (e.g. forums or manufacturer's sites) to identify relevant information. One website may include RepairPal (e.g. https://repairpal.com). The crawler of the system may run over car question data of the website (https://repairpal.com/questions/) and employ a classifier based on a convolutional neural networks (CNN) to detect solution sentences in posted data. The CNN may be a feed-forward neural network that consists of convolutional layers and max pooling layers to extract important features from the input sentences, and an output layer to predict a sentence label.

Figure 2:
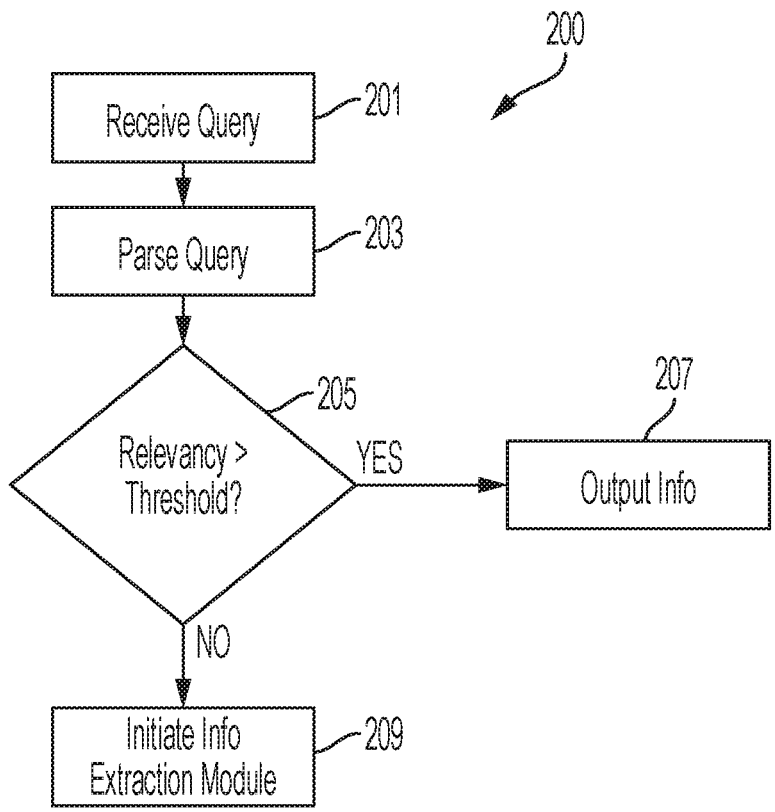
FIG. 2 is an example flowchart of the IR module of the system receiving a query.

FIG. 2 is an example flowchart of an IR module of the system receiving a query. The system may first receive a query at step 201. The query may be input by a user via a computer or through speech technology (e.g., a voice recognition system). The query may refer to an issue that is identified by a user. The query may be received at an online server. For example, the query may be located online at a server.

At step 203, the system may parse the query. The parsing of the query may be conducted by an autoencoder (AE). As discussed below with respect to FIG. 4, the AE may be a neural network model that is utilized to conduct semantic searches. The AE may be utilized to further filter relevant information to be presented to a user in the query. Thus, the AE may be utilized to compress data from the input into a short code, and then uncompressed that code into something that closely matches the original data. The AE described below may be helpful in utilizing a semantic search rather than a keyword search At step 205, the system may determine if the query found in the knowledge base exceeds a threshold. The parsed query may be utilized to search the structured data of the knowledge base to identify various solutions to the issue identified in the query. The knowledge base may include structured data that has defined data sets that may include tables that define solutions, as well as issues that are defined in the structured data. A threshold may exist to define when the information is output or when the information should not be output, as it may be less relevant than the threshold requires.

At step 207, the system may be output if the solution to the query that is found in the knowledge base exceeds a threshold. The output info may be displayed on a screen, such as the one shown in FIG. 6. The output may be found in a tabulated format that has various information tabulated on the screen.

At step 209, the system may initiate the IE module or process if the information found in the knowledge base is below a threshold. For example, if the system is not confident in the information that is shown, the system may need to initiate the IE module to search outside of the knowledge base to find information. While the knowledge base has accurate and detailed information for certain solutions, it may not have a broad range of coverage.

Figure 3:
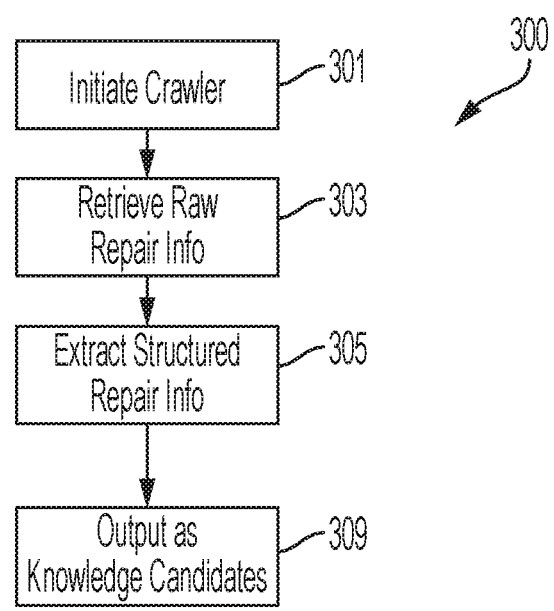
FIG. 3 is an example flowchart of the IE module of the system outputting results of knowledge candidates.

FIG. 3 is an example flow chart 300 of the IE module of the system outputting results of knowledge candidates. FIG. 3 may be an example of the IE function (e.g., car repair information extraction 117) process that is shown in FIG. 1. The system may initiate a crawler 301 to crawl webpages for car repair information. The crawler may work either offline to gather and collect raw data regarding repair information (e.g., identify solutions and issues).

At step 303, the crawler may be used to visit various webpages automatically and retrieve the raw information for analyzing to determine in real-time or later if the information is relevant to a query. The raw repair information may be simply sentences of data or strings of different words or phrases that is not filtered for presentation to a user.

At step 305, the system may extract the structured repair information from the raw repair info. The system may utilize the autoencoder (AE) to help with querying similar semantic searches. The system may employ a keyword-based retrieval algorithm such as BM25 or TF-IDF to obtain a moderate number of relevant candidates as an intermediate result. In extracting the structured repair info, the system may run the AE retrieval algorithm on the intermediate candidate set and form the final ranked list of knowledge candidates. The two-step retrieval enables efficient search by filtering out irrelevant candidates in the first step and using the AE-based retrieval algorithm only against a relatively small number of relevant candidates.

Figure 4:
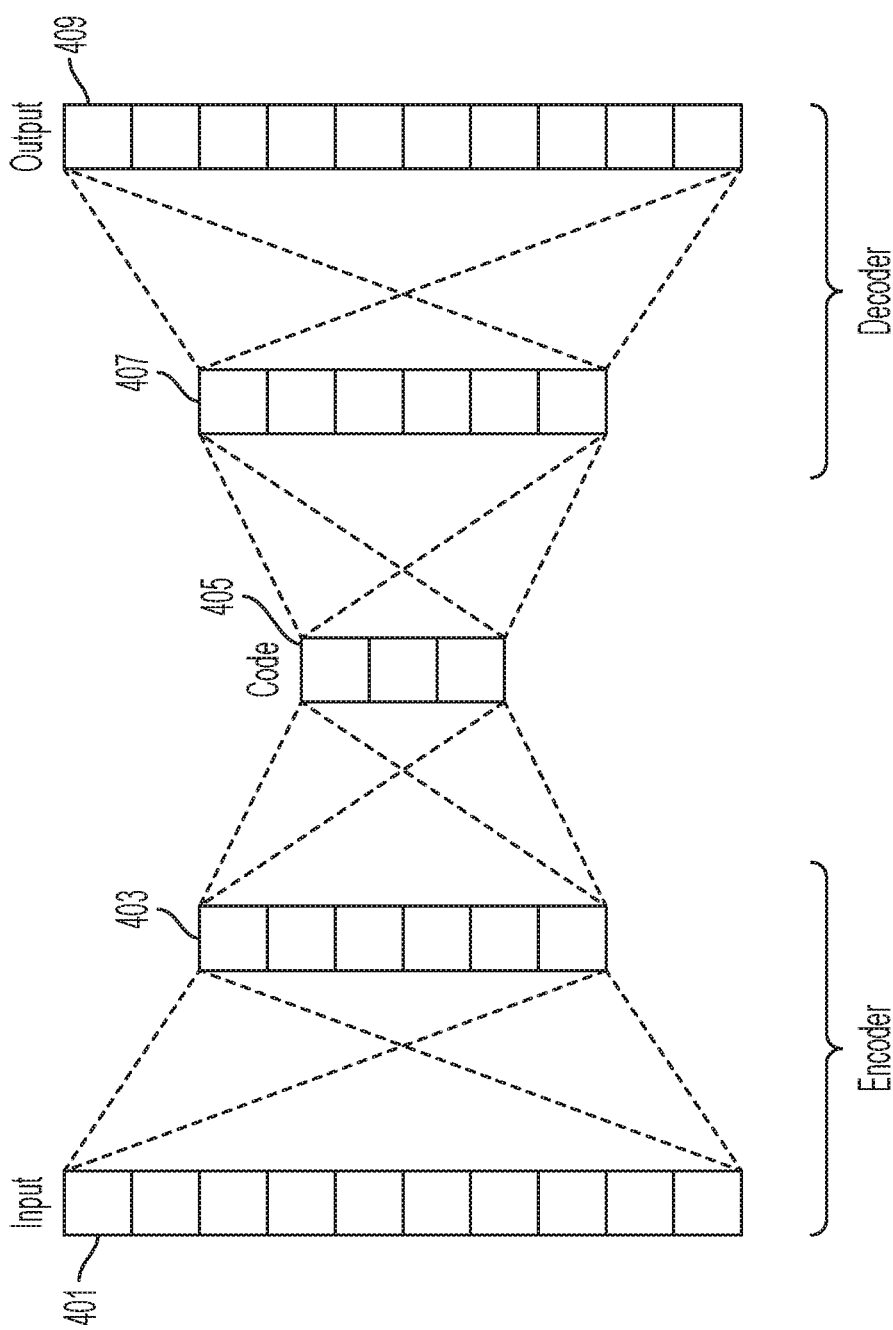
FIG. 4 is an example overview of the autoencoder.

FIG. 4 is an example overview of the autoencoder. The AE may be a neural network model to learn efficient representations in an unsupervised manner by reconstructing its input data. The AE may have various layers that include encoding layers, hidden layers, and decoding layers. By forcing the hidden layers to have lower dimensionality than input data, the AEs may attempt to induce useful features in the representations learned from the reconstruction task. The AE-based search takes place in both Car Problem Retrieval 105 and Knowledge Verification 111 process. The AE may allow for a semantic search that allows for various queries that utilize different words to be efficiently searched. For example, a search stating that the "ABS is not working" may be semantically the same as "There's something wrong with the anti-lock braking system," despite having different words. Thus, a semantic search may search for the meaning as opposed to a lexical search that looks for literal matches of the query words or variants of them, without understanding the overall meaning of the query. The AE may allow the reconstruction task to be unsupervised and allow for leverage of an unlimited amount of data. In one example, the system may use a large amount of car forum data and convert each sentence in the data to one input example. After training the AE, the AE may map a sentence into a vector (e.g. as a learned representation) through the AE. The system may be able to compute the similarity between a query and a problem by calculating the cosine similarity between their vector representations.

The AE may include an encoder layer that includes a first encoder layer 401 and a second encoder layer 403. In one example, the first encoder layer 401 may have 300 dimensional vectors to it. The second encoder layer 403 may have 100 dimensional vectors to it. Each of the encoder layers may identify relevant language to encode to less layers. For example, the first layer may include 300-dimensional vectors while the second layer 403 may include 100 dimensional vectors (e.g. 100 floating numbers). The encoder may parse the text and translate the text to various numbers in each encoding layer. For example, 10 words may be attributed to 10 vectors as a representation of a sentence or a phrase.

A vector representation may be created for each sentence or phrase that is extracted. The vector representation may be used to compute a similarity between phrases. For example, a cosine similarity may be computed to each vector representation. A threshold may be defined to identify a similarity based on the calculation of the cosine similarity between vector representations. For example, if the cosine similarity of vector representations is computed to be at 0.8 or 0.9 and the threshold is 0.5, the system may identify the vector representations to be similar. A calculation of the cosine similarity of 1 may be most similar and a calculation of zero may mean the vector representations are irrelevant.

At the code representation 405 the least amount of vectors may be present. For example, the code representation 405 may have lower-dimensional vectors than representations in both the encoder layer or the decoder layer. The AE may be trained to be able to map a sentence into a vector (e.g., as a learned representation) through the AE. The code representation 405 may be utilized to extract important info from the code. The code vector may be smaller (in dimensional aspect) than the input and output. Thus, the code may be compressed to identify the key important aspects of a sentence.

For example, if there are a million or a billion sentences that are collected in the text collection, a sentence may be converted into a vector representation. If one sentence contains 10 words, each of the 10 words has a vector. The average of those vectors may be used. Thus, any sentence may be converted into a vector. Thus, a code vector of the representation may be very similar to two sentences with different phrases.

Given that both query and problem may be provided in the form of a sentence, the system may first translate a query to a query vector and a problem to a problem vector. The two vectors may have the same dimensionality (e.g., 300 in the first layer). The system may then feed the vectors into the AE to obtain their feature vectors (e.g., code 405) with lower dimensionality (e.g., 100 in the second layer). The system may compute the cosine similarity between the two feature vectors. The output may have the same vector dimensions as the input. However, the vector dimension for the small code 405 may be less than the first and second layer of the input and the first and second layer of the output.

Figure 5:
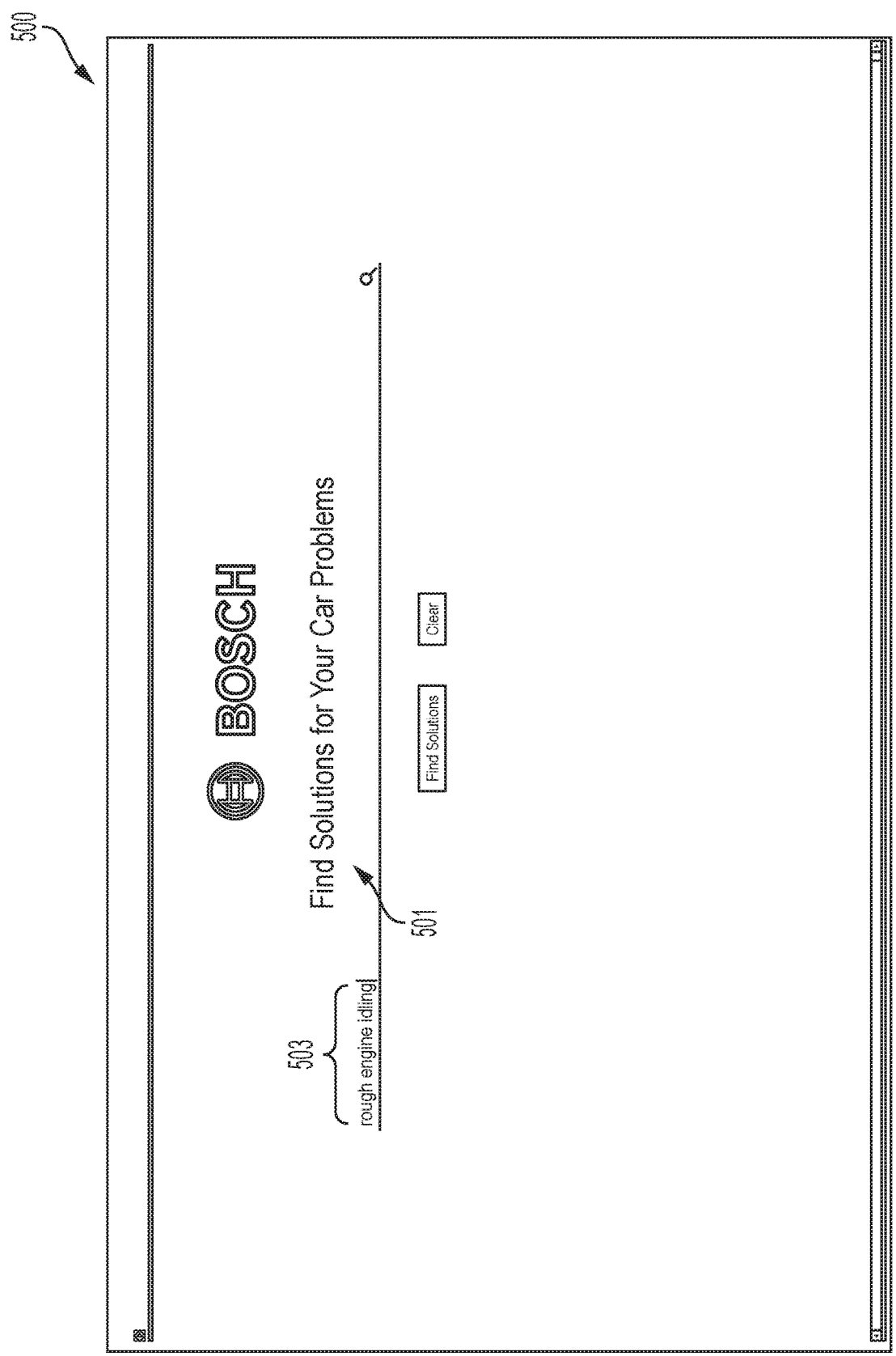
FIG. 5 is an example top page of a natural language query screen of the system.

FIG. 5 is an example top page of a natural language query screen of the system. The screen 500 may be a webpage, website, intranet page, etc. that is utilized for finding issues to resolve car repair problems. A query box 501 may be utilized that allows for a query 503 to be input. The query 503 may be utilized to allow users to input a problem or issue that they are experiencing with their vehicle. In one example, the query 503 may include the phrase "rough engine idling." While the query screen 500 is one example, a natural language processing center may also be utilized.

Figure 6:
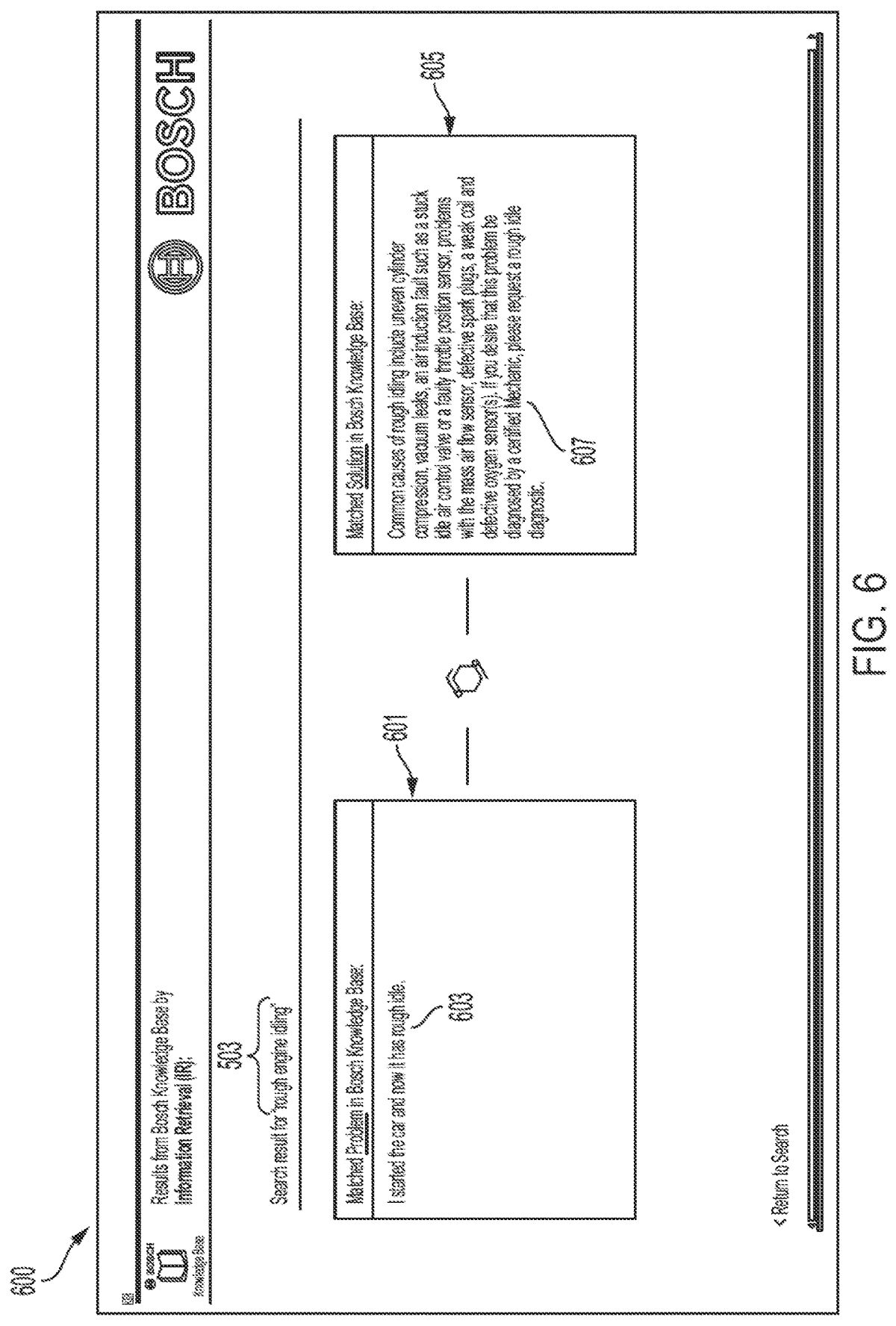

FIG. 6 is an example results screen from the IR module. The IR module may display a first screen 601 of the matched problem in the Bosch Knowledge Base. The first screen 601 may have an identified problem 603 that is phrased or defined by a user or system. For example, the identified problem 603 may be a phrase such as "I started the car and now it has a rough idle." The identified problem 603 may include a variety of problems related to vehicle issues as input by a user.

A second screen 605 may identify a matched solution that is found in the knowledge base. The knowledge base may include a solution 607. The solution may be a sentence, phrase, or paragraph describing how to resolve the identified problem 603. The solution 607 may be retrieved from the database stored as the knowledge base.

FIG. 7 is an example screen 700 of a ranked list of knowledge candidates extracted from the IE module. Such knowledge candidates may be presented when information is not found in the knowledge database. The knowledge candidate screen 700 may include search results from a query 503. For example, the query may include "ABS is not working" to identify a request from a user that the vehicle brakes are experiencing an issue. As previously discussed, the query may be parsed and undertake an autoencoding process to convert the data.

The knowledge candidate screen 700 may include a table that is sorted with various results from a query to a webpage (e.g., Google or Bing). The table may include a rank 703 of the various results. The rank 703 may identify a best match by a ranking of 1. The table may have a limited number of results to be ranked. For example, the embodiment of FIG. 7 shows that there are four different results that are ranked from 1-4.

The table may also include a matched problem 705 section that identifies what the issue is with the vehicle. The matched problem 705 may be related to the query to identify a possible vehicle problem that is associated with the query. For example, for a query that 503 that states "ABS is not working," the matched problem 705 may include that the vehicle doesn't have ABS, the ABS light is on, ABS does not engage during sudden stops, etc.

The table also may have an original answer 707 or the original answer in the post. The original answer may be the paragraph, sentence, or snippet of raw information that is identified by the system. The table may also include a solution extracted by the Information Extraction Algorithm 709. The algorithm may try to extract the most relevant pieces of information to display.

The table may also include a source 711 for the answer or solution to the query. The source 711 may be a webpage or a website. The table may include a hyperlink to the source 711 to allow a user to identify where the answer was found. The source may be a link to an intranet site or another database aside from the web. The table may also include a verification section 713. The verification section 713 may be utilized to identify whether the correct solution to a problem was extracted from the source 711. A user or domain expert may manually verify whether the solution is correct or not. If the link is verified as correct, the system may utilize the solution in the knowledge base by adding the selected problem and solution to the internal knowledge base.

The second column 705 of this table shows problem descriptions, each of which is extracted from a top post in the car forum data. The third column 707 shows original descriptions of the other posts following the top post, which may or may not contain correct solution sentences. The fourth column 709 shows solution descriptions (e.g. sentences) detected from the third column by our solution sentence classifier.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A server comprising:
   a controller in communication with the server, the controller configured to:
   receive and parse a text query related to an issue with a vehicle, wherein the controller is configured to parse the text query utilizing an autoencoder to encode, compress, and decode the text query, wherein the autoencoder includes a first encoder layer and a second encoder layer, wherein the second encoder layer includes less dimensional vectors than the first encoder layer, and the autoencoder includes a first decoder layer and a second decoder layer;
   in response to the text query, retrieve information related to the text query from a database that includes structured data in a data schema related to both vehicle issues and a solution to the vehicle issues;
   determine whether the database is responsive to the text query; and
   in response to the determination, output information including the solution to the issue when the solution is found in the database, and when the solution is not found in the database, retrieve solution information from a website utilizing an information exchange module configured to utilize knowledge verification processing that utilizes knowledge bases associated with the database with a pre-defined scheme to assess information extracted from sources outside of the knowledge bases when information found in the knowledge bases is below a threshold, wherein the controller is further configured to retrieve the solution information from the websites by conducting a keyword search for a first set of results.

2. The server of claim 1, wherein the autoencoder is configured to utilize an input associated with the text query, wherein the input includes the first encoding layer with a first vector dimension that includes numerical vectors.

3. The server of claim 2, wherein the autoencoder is configured to encode the input to a short code that includes a coding vector dimension, wherein the first vector dimension includes more vectors than the coding vector dimension.

4. The server of claim 3, wherein the autoencoder is configured to decode the short code to an output that includes on a first decoding dimension, wherein the first decoding dimension is larger than the coding vector dimension.

5. The server of claim 1, wherein the controller is further configured to filter the information from the website utilizing an autoencoder, and utilize input from a domain expert to verify the information extracted from sources outside of the knowledge base.

6. The server of claim 5, wherein the controller is further configured to output the filtered information retrieved from the website.

7. The server of claim 6, wherein the controller is further configured to store the filtered information into the database.

8. The server of claim 7, wherein the controller is further configured to store the filtered information into the database in response to an input received from a user.

9. The server of claim 8, wherein the controller is further configured to store the filtered information into the database by converting it to the structured data.

10. A server comprising:
    a controller in communication with the server, the controller configured to:
    receive and parse a text query related to an issue with a vehicle;
    in response to the text query, retrieve information related to the text query from a database that includes structured data including data related to vehicle issues and a solution to the vehicle issues;
    determine whether the database includes structured data including data related to the solution responsive to the text query;
    output information including the solution to the issue when the determination identifies that the structured data including the solution in the database and when the determination identifies that the structured data is not found in the database, retrieve information from a website when the determination identifies, wherein the controller is further configured to retrieve the information from the website by utilizing knowledge verification processing that utilizes knowledge bases associated with the database with a pre-defined scheme to assess information extracted from sources outside of the knowledge bases when information found in the knowledge bases is below a threshold and conducting a keyword search at the website for a first set of results and filtering the information from the website utilizing an autoencoder, wherein the autoencoder includes a first encoding layer and a second encoding layer and a first decoding layer and a second decoding layer, and a hidden layer, wherein the hidden layer includes a lower dimensionality than input data associated with the text query.

11. The server of claim 10, wherein controller is configured to parse the text query by utilizing the autoencoder configured to encode the text query to the first encoding layer with a first vector dimension, and further encoding the first encoding layer to the second encoding layer with a second vector dimension, wherein the first vector dimension includes more vectors than the second vector dimension.

12. The server of claim 11, wherein the controller is configured to encode the second encoding layer to code that includes a coding vector dimension, wherein the second vector dimension includes more vectors than the coding vector dimension.

13. The server of claim 12, wherein the code includes less vectors than the first encoding layer and the second encoding layer.

14. The server of claim 13, wherein the controller is further configured to decode the code to a first decoding layer includes a first decoding vector dimension, wherein the first decoding vector dimension includes more vectors than the coding vector dimension.

15. The server of claim 14, wherein the controller is further configured to decode the first decoding layer to a second decoding layer that includes a second decoding vector dimension, wherein the second decoding vector dimension includes more vectors than the first decoding vector dimension.

16. The server of claim 10, wherein the controller is further programmed to output the filtered information from the website.

17. A querying system, comprising:
an input device configured to allow a user to enter a text query related to automotive repairs;
a display configured to output information related to the text query;
a database that includes structured data with a data related to vehicle issues and a solution to the automotive repairs; and
a processor in communication with the input device, database, and display, wherein the processor is programmed to:
receive and parse the text query;
in response to the text query, retrieve information related to the text query from the database that includes a solution to the automotive repairs;
determine whether the database includes structured data including data related to the solution responsive to the text query; and
output information including the solution to the issue when the structured data including the solution is found in the database and when the determination identifies that the structured data is not found in the database retrieve information from a website, wherein the processor is further configured to retrieve the information from the web site by conducting a keyword search for a first set of results and filtering the information from the website utilizing an autoencoder to define a second set of results, wherein the autoencoder includes a first encoder layer and a second encoder layer, wherein the second encoder layer includes less dimensional vectors than the first encoder layer, and the autoencoder includes a first decoder layer and a second decoder layer, wherein knowledge verification processing that utilizes knowledge bases associated with the database with a pre-defined scheme is utilized to assess information extracted from sources outside of the knowledge bases when information found in the knowledge bases is below a threshold, wherein cosine similarities between a first feature vector and a second feature vector are computed to identify the solution.

18. The querying system of claim 17, wherein the processor is further programmed to output the second set of results on the display.

19. The querying system of claim 17, wherein the processor is further programmed to store the second set of results in the database in response to input from a user.

20. The querying system of claim 17, wherein the processor is further programmed to utilize a crawler to crawl a plurality of web pages to extract raw information from the web pages in response to the text query.

* * * * *